Figure 1:
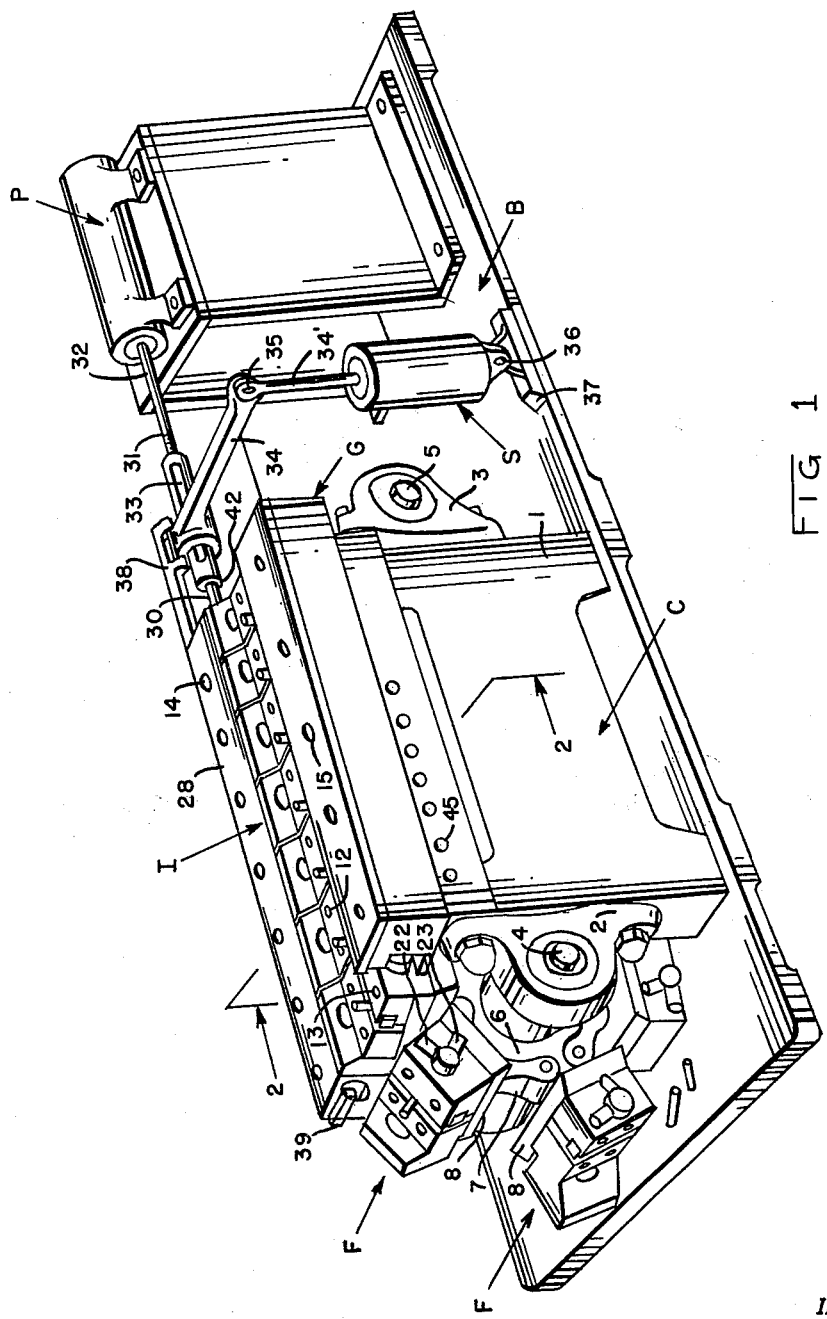

United States Patent Office 3,108,676
Patented Oct. 29, 1963

3,108,676
TRANSFER MACHINE
Howard E. Rommel, 451 Center Road, Easton, Conn.
Filed Feb. 9, 1962, Ser. No. 172,293
5 Claims. (Cl. 198—19)

This invention relates to transfer machines of the indexing work-station-type chain conveyors, and particularly to a new and improved mechanism for jointly indexing to an accurate position and rigidly holding a number of work stations while working operations are performed at one or more of said stations.

Prior known devices index the conveyor by one mechanism and employ separate and individual locking wedge means for the positioning of the individual work stations. These prior known devices cannot accurately maintain the spacing between the successive work stations during the indexing of the chain type conveyor.

The principal object of the present invention is to provide a mechanism for jointly indexing to an accurate position and rigidly holding a number of work stations of an indexing station-type chain conveyor.

Another object of this invention is to provide such a device that will accurately maintain the spacing between a number of work stations during the indexing of the chain type conveyor from one work station to the next successive work station.

Still another object of this invention is to provide such a device that will have the capability of rigidly holding a number of work stations after successive indexes and while machining operations or assembly operations are performed on work secured to the conveyor chain at the work stations.

The above, as well as other objects and novel features of the invention will be come apparent from the following specification and accompanying drawings which are merely exemplary.

Figure 2:
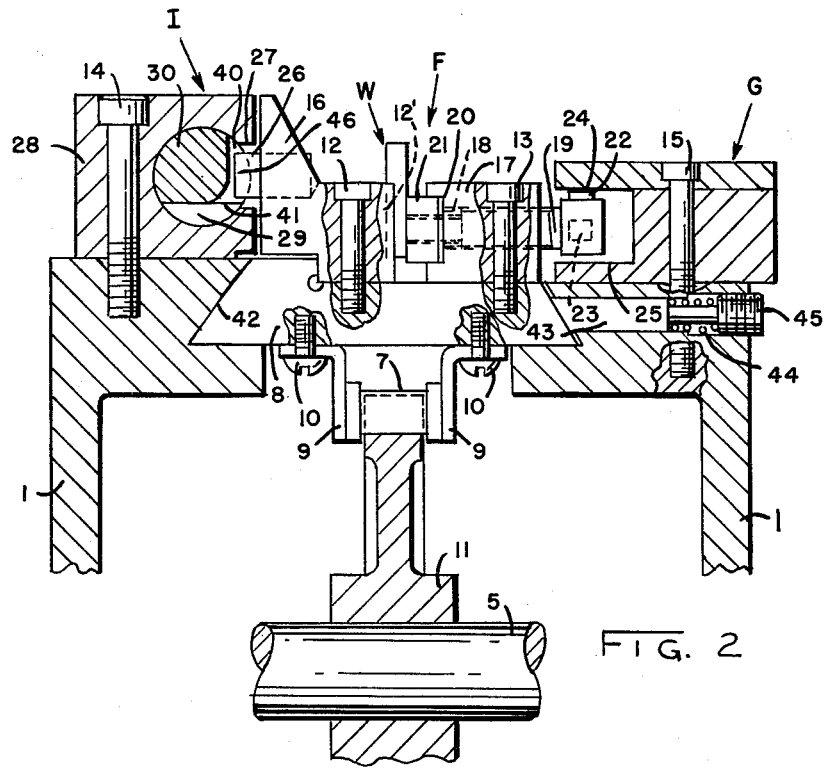

In the drawings:

FIG. 1 is a perspective view of the exterior configuration of an indexing work-station-type chain conveyor to which the principles of the invention have been applied; and FIG. 2 is a sectional elevational view taken substantially along line 2—2 of FIG. 1.

Referring to the drawings, and particularly to FIG. 1, the principles of the invention have been shown as applied to an indexing work-station-type chain conveyor including a base plate B, upon which are mounted an indexing work-station-type chain conveyor assembly C, a locking clevis including a fluid-actuated cylinder assembly S and a fluid-actuated indexing cylinder assembly P. On the lefthand end of the indexing work-station-type chain conveyor assembly C, as viewed in FIG. 1, is mounted a pair of transversely aligned bearing pillow blocks 2 that are fixed to the base frame 1. The bearing pillow blocks support an idler shaft 4 upon which is mounted a sprocket 6 which is in driving engagement with an endless chain 7. In a similar manner, on the righthand end of the indexing work-station-type chain conveyor assembly C, as viewed in FIG. 1, is mounted a pair of transversely aligned bearing pillow blocks 3 that are also fixed to the base frame 1. The bearing pillow blocks 3 support an idler shaft 5 upon which is mounted a sprocket 11 identical with sprocket 6 and shown in FIG. 2. Sprocket 11 is also in driving engagement with the endless chain 7.

Referring to FIG. 2, fixture bases 8 are secured, by screws 10, to chain attachments 9 carried on the endless chain 7. These fixture bases 8 are restrained by a dovetail construction including angular surface 42 of the base 1 on one side and angular wedges 43 which are backed up by springs 44 and a screw 45. A series of work holding fixture assemblies F are secured to the conveyor chain 7 and are mounted on the fixture bases 8 (one for each base) by means of screws 12 and 13, and bases 8 travel with the conveyor chain 7. On the back side of the indexing work-station-type chain conveyor assembly C, as viewed in FIG. 1, an indexing and holding-rod-housing assembly I is bolted to the base 1 by screws 14, the operation of which will be explained in detail later. On the front side of the indexing work-station-type chain conveyor assembly C, as viewed in FIG. 1 (right side of FIG. 2), a double cam housing G is bolted to the base 1 by screws 15, the operation of which will be explained in detail later.

Referring to FIG. 2, the work holding fixture assemblies F may comprise a back-up jaw 16 bolted to the fixture base 8 by means of screws 12. The jaw 16 may include a vertical oriented V-groove 12' to receive a work piece W. Each work holding fixture assembly F may also have a clamping jaw screw block 17 which is bolted to a fixture base 8 by means of screws 13, and block 17 may have a threaded hole 18 to be engaged with a threaded clamping screw 19. The clamping jaw screw blocks 17 also may contain open sided slots 20 to receive a work clamping jaw 21. The righthand end of the clamping screw 19, as viewed in FIG. 2, has a radially mounted clamping pin 22, and also a radially mounted unclamping pin 23.

The cam housing assembly G is bolted by screws 15 to the base frame 1 and contains an upper clamping cam surface 24 and a lower unclamping cam surface 25. Thus, when the work holding fixture assemblies F, which are mounted on the chain 7, successively index into the entrace of cam housing assembly G, the clamping pin 22 of each assembly first engages the clamping cam surface 24, rotating the clamping screw 19 and clamping the work W (inserted manually) with the clamping jaw 21. When the work holding fixture assemblies F successively index through the exit portion of the cam housing assembly G, the unclamping pin 23 of each assembly engages the unclamping cam surface 25, rotating the clamping screw 19 in a direction to release the work W. As the work holding fixture assemblies F pass around and under the chain sprocket 6, the work W falls onto the base plate B. Each of these work holding fixture assemblies F also may contain a pin 26 which is tightly held in the back-up jaw 16 and extends into a slot 27 which extends the full length of an indexing rod housing 28. The indexing rod housing 28 also has a hole 29 bored through its full length to receive an index and locking rod 30 which latter extends through the indexing rod housing 28 to the threaded end 31 of an index cylinder rod 32 (FIG. 1) to which it is threadingly connected. This threaded end 31 of the index cylinder rod also has a keyway 33 therein for holding to it a lever arm 34 against relative rotation. The outer end of the lever arm 34 is pivotally connected to a piston rod 34' by a pin 35. The rod 34' is connected to a piston within the fluid-operated cylinder assembly S which, in turn, is mounted on a clevis pin 36 of a clevis block 37 which is secured to the base plate B. The lever arm 34 engages a forked bracket 38 attached to the indexing rod housing 28 to prevent its movement axially of the rod 30. On the lefthand end of the indexing rod housing 28 is secured a stop block 39 to positively limit the leftward motion of the index rod 30 when it is advanced leftwardly by the actuation of the index cylinder assembly P. The index rod 30 also contains exactly equally spaced slots 40, the distance between slots 40 being the distance from one work station to the next one. The width of the slots 40 is substantially the same as the outside diameter of the pins 26. The index rod 30 also has a flat surface 41 which extends from the extreme left end, as viewed in FIG. 1, up to the shoulder 42 of the portion including keyway 33.

Referring again to FIG. 1, the operation of the work-station-type chain conveyor is such that the cylinder assembly S is actuated by pulling the lever arm 34 downwardly through an arc of substantially 90°. This rotates the index rod 30, and with it the flat portions 41, 90° from a vertical position to the horizontal position shown in FIG. 2. The 90° rotation of the index rod effects the engagement of the pins 26 in the slots 40 of the index rod 30. Sequentially, cylinder assembly P is actuated to advance the rod 30, and with it all work holding fixture assemblies F to the next station when rod 30 abuts positive stop 39. This action also advances the conveyor chain and rotates the chain sprockets 6 and 11. In addition, this action effects the operation of the back-up jaws 16 as previously explained. As already mentioned, the forward motion of the cylinder assembly P and index rod 30 is terminated by stop block 39 (which may be adjustable) and holds the jaws 16 in position by the fluid pressure on the cylinder assembly P while a working operation is performed on the work pieces W. At the completion of the working operation, the locking cylinder assembly S is actuated to rotate the lever arm 34 upwardly through substantially 90°. This action also rotates the index rod 30 through 90° and rotates the flat surface 41 from the horizontal position shown (FIG. 2) to a vertical position. Accordingly, the flat surface 41 of the index rod 30 clears the end 46 of the pins 26, and the index rod 30 is retracted by the cylinder assembly P a distance equal to a multiple of the distance from one work holding fixture assembly F to the next succeeding one. This retractual operation of the cylinder assembly P retracts only the index rod 30, leaving the work holding fixture assemblies F in their last indexed position.

Although the various features of the new mechanism for jointly indexing a work-station-type chain conveyor to an accurate position and rigidly holding a number of work stations in indexed position have been shown and described in detail to fully disclose one embodiment of the invention, it will be evident that changes may be made in such details and certain features may be used without others without departing from the principles of the invention.

What is claimed is:
1. A transfer machine comprising, in combination:
  (a) a base part,
  (b) a carrier part movable on the base part and having means for holding workpieces, said carrier part being adapted to transport the workpieces to and from an operation-performing station,
  (c) a pair of cooperable indexing means located one on the base part and the other on the carrier part to effect a stepped advancing movement of the latter,
  (d) one of said indexing means comprising a plurality of spaced projections on one part,
  (e) the other of said indexing means comprising a longitudinally reciprocable and also turnable bar on the other part,
  (f) power means for selectively and reversibly turnably shifting and longitudinally shifting said bar,
  (g) said bar having a notch in one side, adapted to receive and engage one projection at a time when the bar is in one rotative position, the shifting of the bar out of said one rotative position effecting disengagement of a received projection from the notch, and
  (h) at least one of said indexing means having a tapered guide structure to facilitate entry of the projections in the notch.

2. A transfer machine as in claim 1, wherein:
  (a) the tapered guide structure comprises rounded surfaces of the pins.

3. A transfer machine as in claim 1, wherein:
  (a) the bar has a longitudinal flat along one side to provide clearance for the projections, and
  (b) the notch is located in an adjoining side and is accessible from the flat of the bar.

4. A transfer machine comprising, in combination:
  (a) a base part,
  (b) a carrier part movable on the base part and having means for holding workpieces, said carrier part being adapted to transport the workpieces to and from an operation-performing station,
  (c) a pair of cooperable indexing means located one on the base part and the other on the carrier part to effect a stepped advancing movement of the latter,
  (d) one of said indexing means comprising a projection on one part,
  (e) the other of said indexing means comprising a longitudinally reciprocable and also turnable bar on the other part,
  (f) power means for selectively and reversibly turnably shifting and longitudinally shifting said bar,
  (g) said bar having a plurality of notches in one side, adapted to individually receive and engage the said projection when the bar is in one rotative position, the shifting of the bar out of said one rotative position effecting disengagement of a received projection from the notch, and
  (h) at least one of said indexing means having a tapered guide structure to facilitate entry of the projection in the notches.

5. A transfer machine as in claim 1, wherein:
  (a) the bar has a longitudinal flat along one side to provide clearance for the projection, and
  (b) the notches are located in an adjoining side and are accessible from the flat of the bar.

References Cited in the file of this patent
UNITED STATES PATENTS

| 2,745,167 | Cross | May 15, 1956 |
| 2,830,712 | Sykokis | Apr. 15, 1958 |